United States Patent
Rees et al.

(10) Patent No.: US 10,645,935 B2
(45) Date of Patent: May 12, 2020

(54) METHODS AND COMPOSITIONS FOR CONTROLLING FUNGUS AND FUNGAL SPORES AND IMPROVING PLANT QUALITY

(71) Applicant: BAYER CROPSCIENCE LP, Research Triangle Park, NC (US)

(72) Inventors: Richard Rees, Chapel Hill, NC (US); Michael Newnam, Willow Spring, NC (US); David Orlebeke, Ridgecrest, CA (US)

(73) Assignee: Bayer CropScience LP, St. Louis, MO (US)

( * ) Notice: Subject to any disclaimer, the term of this patent is extended or adjusted under 35 U.S.C. 154(b) by 85 days.

(21) Appl. No.: 15/700,849

(22) Filed: Sep. 11, 2017

(65) Prior Publication Data
US 2018/0084784 A1   Mar. 29, 2018

Related U.S. Application Data

(60) Provisional application No. 62/398,942, filed on Sep. 23, 2016.

(51) Int. Cl.
| | | |
|---|---|---|
| *A01N 63/50* | (2020.01) | |
| *A01N 59/00* | (2006.01) | |
| *A01N 63/00* | (2020.01) | |
| *A01N 63/10* | (2020.01) | |

(52) U.S. Cl.
CPC ............ *A01N 63/00* (2013.01); *A01N 59/00* (2013.01); *A01N 63/10* (2020.01); *A01N 63/50* (2020.01)

(58) Field of Classification Search
None
See application file for complete search history.

(56) References Cited

U.S. PATENT DOCUMENTS

| | | | | |
|---|---|---|---|---|
| 6,663,860 | B1* | 12/2003 | Tvedten | A01N 63/00 424/84 |
| 6,802,956 | B2 | 10/2004 | Orlebeke | |
| 2006/0289354 | A1 | 12/2006 | Zhou et al. | |
| 2009/0317378 | A1* | 12/2009 | Perraudin | A61K 33/00 424/130.1 |
| 2014/0030228 | A1* | 1/2014 | Blotsky | A61K 35/74 424/93.4 |
| 2014/0128256 | A1* | 5/2014 | Asolkar | C12R 1/07 504/101 |
| 2015/0231060 | A1* | 8/2015 | Okay | A61K 35/57 424/465 |
| 2017/0356002 | A1* | 12/2017 | Thompson | C12N 15/8249 |

OTHER PUBLICATIONS

Bahar et al "Species difference of esterase expression and hydrolase activity in plasma" Journal of Pharmaceutical Sciences, 2012, vol. 101, No. 10, pp. 3979-3988. (Year: 2012).*
Purdue University "Turfgrass Disease Profiles" 2007, 2 pages. (Year: 2007).*
Subdue Maxx fungicide label.
Segway fungicide label, Mar. 10, 2010.
Stellar Fungicide label.
Subdue Maxx fungicide label. Syngenta. 2017.
Banol fungicide label. Bayer Environmental Science. 2015.
Segway fungicide label. Mar. 20, 2010.
Stellar Fungicide label. Valent Professional Products. 2014. EPA Reg. No. 59639-143. EPA Est. No. EPA Est. 39578-TX-01.
Chipco Signature fungicide label. EPA Reg. No. 432-890.
Aliette WDG fungicide label. Bayer Environmental Science. EPA Reg. No. 432-890.

* cited by examiner

*Primary Examiner* — Allison M Fox
(74) *Attorney, Agent, or Firm* — McBee Moore & Vanik IP, LLC

(57) ABSTRACT

Methods and compositions for controlling or reducing fungal spores in a plant or crop. The disclosure further provides for compositions and methods of improving turfgrass and/or ornamental grass quality.

18 Claims, No Drawings

METHODS AND COMPOSITIONS FOR CONTROLLING FUNGUS AND FUNGAL SPORES AND IMPROVING PLANT QUALITY

CROSS REFERENCE TO RELATED APPLICATIONS

This application claims priority to U.S. Provisional Application No. 62/398,942, filed Sep. 23, 2016, the contents of which are incorporated herein by reference in its entirety.

FIELD

The disclosure provides methods and compositions for controlling, reducing, or eliminating fungus and fungal spores in a plant or crop. The disclosure further provides for compositions and methods of improving turfgrass and/or ornamental grass quality.

BACKGROUND

There is an ongoing need to develop compositions and/or methods that are capable of reducing fungus and fungal spores in a plant or crop, and for improving turfgrass and/or grass quality. While many fungicides and compositions are known for controlling various fungi in plants and crops, there is an ongoing demand for new fungicidal compositions. For example, repeated use of fungicides has been known to result in the development of resistant populations of fungus. Furthermore, the fungicidal compositions may be ineffective in controlling the fungus, for example, due to extreme environmental conditions.

Consistent control of *Pythium* species in plant systems are a wide-scale problem in the industry. *Pythium* disease, also known as *Pythium* blight, is a highly destructive turfgrass disease caused by several different *Pythium* species.

Members of the genus *Pythium* belong to a group of fungal-like organisms broadly known as water molds. *Pythium* species belong to the class Oomycota and are commonly referred to as oomycetes. *Pythium* species are commonly referred to as fungi. However, *Pythium* species are actually members of the kingdom Chromalveolata.

*Pythium aphanidermatum* and *Pythium ultimum* are most commonly associated with *Pythium* blight. As many as 15 species of *Pythium* are cited as causative agents of *Pythium* blight. The most severe symptoms are associated with *Pythium aphanidermatum*.

Symptoms associated with *Pythium* blight are evident during warm, humid weather, specifically when turfgrass remains wet for 12 or more hours. *Pythium* blight is particularly severe when daytime temperatures exceed 28° C. and night temperatures remain above 20° C.

Initial symptoms of *Pythium* blight appear as water-soaked leaves that are dark green, blue, brown, or purple in color. Affected leaves aggregate into circular or irregularly shaped patches in turfgrass swards. These patches can range in size from less than 1 cm to greater than 20 cm in diameter.

Infected leaves of turfgrass generally feel slimy or greasy to the touch. Patches of infected grass can enlarge and coalesce, thereby causing damage to lawns, golf courses and athletic field turf. *Pythium* blight can also manifest in streak patterns in areas in which the disease is spread by flowing water or mowing equipment.

Foliar blight, crown rot, stolon rot, and root rot are associated with *Pythium* blight.

*Pythium* blight, also referred to as "spot blight", "grease spot", or "cottony blight," was first reported in the 1930s. Initially, *Pythium* blight was thought to only affect golf course turf. However, this disease is now recognized as a problem for lawns and athletic fields as well.

*Pythium* has been detected on warm- and cool-season turfgrass species in the United States, Canada, Germany, France, and Japan.

Fungicides in several classes have been shown to be effective for controlling *Pythium*. These classes of fungicides include aromatic hydrocarbons, carbamates, dithiocarbamates, phenylamides, phosphonates, and quinone outside inhibitors, which include strobilurins.

The first fungicides used to control *Pythium* include inorganic mercury, captan, dichlone, cycloheximide, and organic mercury compounds. However, these compounds only exhibited limited control of *Pythium* blight.

In 1979, the fungicide metalaxyl was registered in the United States for purposes of controlling oomycetes. This included the specific use for controlling *Pythium* blight on turfgrasses.

Additional fungicides used to control *Pythium* include mefenoxam (Subdue Maxx®) and propamocarb (Banol®), cyazofamid (Segway®) and fluopicolide (Stellar®), which have been shown to be effective.

However, repeated use of fungicides, particularly metalaxyl or mefenoxam, may select for resistant populations of *Pythium aphanidermatum*. In 1983, metalaxyl-resistant populations of *Pythium aphanidermatum* were detected in creeping bentgrass samples taken from Pennsylvania golf courses where metalaxyl was used extensively over a period of three years. More recently, isolates of *Pythium ultimum* taken from greenhouse-grown ornamental and turfgrass plants have shown resistance to mefenoxam in laboratory assays.

Furthermore, phosphonate products, such as fosetyl A1 (Chipco Signature®), may be effective only when applied as a preventative measure, and only when *Pythium* blight pressure is low to moderate.

Additional methods of controlling *Pythium* include sterilization of irrigation equipment, water bodies, plant growing systems based on hydroponics, and sand-based growing media.

There is a continuing need to provide compositions and methods for controlling fungal infestations and *Pythium* blight in plants, such as turfgrass and other ornamental plants, as well as greenhouse and field crops.

SUMMARY

The present invention provides for formulations comprising an enzyme and/or an oxidizer, wherein the formulations reduce fungal spores in a plant or crop and improves turfgrass and/or grass quality.

Preferred formulations include both an enzyme and oxidizer.

It has been found that compositions comprising an enzyme and/or an oxidizer can demonstrate unexpected properties of reducing or controlling fungal spores in plants or crops and of improving turfgrass and/or ornamental grass quality.

The disclosure provides for a method of reducing or controlling damage from fungal spores in a plant or crop, for example fungal spores in turfgrass, by treating soil, a seed, a plant, and/or a plant part with a composition including an enzyme and/or an oxidizer.

The disclosure further provides for a composition comprising an enzyme and/or an oxidizer.

The disclosure further provides for a composition comprising a synergistic combination of an enzyme and an oxidizer.

Seeds, plants, and/or plant parts treated with compositions described herein are also described.

Further objects, features, and advantages of the invention will become apparent from the detailed description that follows

DETAILED DESCRIPTION

Applicants have found that compositions comprising an enzyme, compositions comprising an oxidizer, and compositions comprising both an enzyme and oxidizer, provide excellent fungicidal properties and can provide unexpected properties of reducing or controlling fungal spores in plants or crops and of improving turfgrass and/or ornamental grass quality.

"Controlling" denotes a preventive, treatment, or curative reduction of the damage in comparison to the untreated plant, more preferably the infestation is essentially repelled, most preferably the fungal infestation is totally suppressed. The application of the composition can be applied preventatively before fungal infestation and/or after infestation to cure or control infestation. The enzyme and oxidizer can be applied together in a single composition or from different compositions. Also, they can be applied sequentially, either the enzyme or oxidizer being applied first. They can be used alone or together. One or more enzymes and one or more oxidizers can be used, alone or together.

"Fungus" should be understood as meaning all species of fungi, as well as all fungus-like organisms, including oomycetes.

"Fungal spores" should be understood as meaning all spores produced by all species of fungi and fungus-like organisms, including oomycetes.

Any desired enzymes can be used. Any desired oxidizers can be used. They are used in amounts and ratios to provide control of fungus, reduction of fungus, and/or increases in yield of the plant.

These two components can be used in any desired amount and any desired ratio that gives the desired results of controlling fungal infestation.

In an aspect, the disclosure provides for a method described herein, wherein a composition comprising an enzyme and/or an oxidizer is applied to a crop, plant, or habitat thereof, wherein the enzyme is present at a concentration of 0.0001% to 10%, or 0.001% to 5% or 0.005% to 1%, or 01% to 0.5%.

In another aspect, the disclosure provides for a method described herein, wherein a composition comprising an enzyme and/or an oxidizer is applied to a crop, plant, or habitat thereof, wherein the oxidizer is present at a concentration of 0.0001% to 10%, or 0.0005% to 1% or 0.001% to 0.1%, or 0.01% to 0.05%. Amounts of enzyme when used alone, and oxidizer when used alone, and when both are used, should be used which are not phytotoxic to the plant or turfgrass treated, but which control the fungus.

In yet another aspect, the disclosure provides for a method described herein, wherein a composition comprising an enzyme and an oxidizer is applied to a crop, plant, or habitat thereof, wherein the weight ratio of the enzyme to the oxidizer is from 1:50 to 50:1, or 1:25 to 25:1, or 1:15 to 15:1, or 1:5 to 5:1

Enzymes that can be included in the present invention include any enzyme or mixture of enzymes. Examples of enzymes that can be used are set forth in U.S. Pat. No. 6,802,956, which is incorporated herein by reference in its entirety.

Useful enzymes include without limitation one or more members of the following enzyme classes: phosphatases (including alkaline phosphatase and acid phosphatase), esterases, catalases, dismutases, nucleotidases, proteases (including peptidases), amylases, lipases, uricases, gluconases, lactases, oxygenases, and cellulases. Preferably, the enzymes used in the present invention include one or more hydrolytic enzymes, or hydrolases. For example, a mixture of enzymes may include one or more protease enzymes, one or more amylase enzymes, and one or more lipase enzymes. The particular composition of enzymes used may vary with the type and amount of fungus present in the turfgrass undergoing treatment, and the amount and type of enzymes added may therefore be tailored to the individual situation.

Enzymes may be applied to the turfgrass undergoing treatment before or during treatment. The enzymes may be added in substantially pure form, or added as a homogeneous or heterogeneous mixture that includes other components. Enzymes typically perform multiple functions that increase the efficiency of the antifungal treatment, generally by converting complex chemical compounds into less complex species. A particular source of enzymes useful in conjunction with the treatment described herein is Orenda Technologies (Trumbull, Conn.), which supplies suitable enzyme mixtures under the product names CV-600, CV-605, CV-610, and CV-635.

The presence of active hydrolytic enzymes exponentially increases the rate at which organic contaminants are degraded. The rate at which reduction/oxidation processes clear the chemical species in the medium is also increased.

Hydrolase, an enzyme traditionally used for the control of bacteria in feedlot ponds to remove unpleasant odors, is an exemplary enzyme that can be used. Peroxides, such as hydrogen peroxides and superoxide are exemplary oxidizers that can be used. In some embodiments, ultraviolet light should not be used since it can reverse activity. "Hydrolase" denotes the enzyme type that works to break chemical bonds between carbon and hydrogen molecules.

Useful oxidizers include, without limitation, one or more members of the following oxidizer classes: hydrogen peroxide and other inorganic peroxides, Fenton's reagent, fluorine, chlorine, bromine, iodine, nitric acid, nitrates, nitrous oxide, sulfuric acid, peroxydisulfuric acid, peroxymonosulfuric acid, sulfates, manganates, permanganates, hexavalent chromium compounds such as chromates, dichromates, and chromium trioxide, sulfur dioxide, chlorates, hypochlorites, bismuthates, perborates, oxygen, and ozone.

Alternatively, oxygen radical generators may be used either in place of, or in addition to, oxidizers. Useful oxygen radical generators include, without limitation one or more members of the following oxygen radical generator classes: peroxides, superoxides, hydroxyl radical generators, peroxynitrites, nitric oxide, and fatty acids.

Saccharide coating on fungal spores can prevent the incursion of peroxide or superoxide into fungal spores from common bleaching agents. It has been found that the use of an enzyme breaks down the saccharide coating and allows for the entry of peroxide/superoxide into the spores to thereby kill, destroy or control the fungal spores.

Furthermore, it has been found that due to the nature of the enzymatic action, organic residue (such as the saccharide coating) in the soil dissolves over time, increasing aeration and preventing compaction, and allowing for superior control of fungal infestation.

Any plant or crop prone to or suffering from fungal infestation, in particular, prone to *Pythium* blight can be treated by the present invention. Examples include turfgrasses and other ornamental plants, as well as crops. Furthermore, the present invention can be used to treat any plant affected by root rots associated with *Pythium* (also referred to as "damping off") or any other dysfunctions associated with *Pythium*. *Pythium* is especially a problem for emerging or young plants and the present invention can be used to control fungus in such plants.

Turfgrass can be especially treated effectively by the present invention. Turfgrasses include all grasses such as St. Augustine grass, bermudagrass, bahiagrass, buffalograss, centipedegrass, Kentucky bluegrass, fine fescue, tall fescue, perennial ryegrass, creeping bentgrass, zoysiagrass, crabgrass, guineagrass, pangolagrass, torpedograss, and tropical carpetgrass. Species of turfgrass include creeping bentgrass, which includes "Penncross", "Penneagle", and "A1".

The combination of enzyme and oxidizer can be formulated in any desired manner and include any desired excipients. Also separate formulations of enzyme and oxidizer can be used and applied together or sequentially to control fungi.

The compositions can be formulated as a foliar composition, a drench or foliar spray, solutions, emulsions, suspension, coating formulation, encapsulated formulation, solid, liquid, fertilizer, paste, granule, powder, suspension, or suspension concentrate. The composition may be employed alone or in solid, dispersant, or liquid formulation. In yet another aspect, a composition described herein is formulated as a tank-mix product.

Preferably, the compositions should be applied as a drench or foliar spray and the treated plants or crops should be irrigated after application.

These formulations are produced in any desired or known manner, for example by mixing the active compounds with extenders, such as liquid solvents, pressurized liquefied gases and/or solid carriers, optionally with the use of surface-active agents, such as emulsifiers and/or dispersants and/or foam formers. If the extender used is water, it is also useful to employ for example organic solvents as cosolvents. Suitable liquid solvents include: aromatics, such as xylene, toluene or alkylnaphthalenes, chlorinated aromatics or chlorinated aliphatic hydrocarbons, such as chlorobenzenes, chloroethylenes or methylene chloride, aliphatic hydrocarbons, such as cyclohexane or paraffins, for example mineral oil fractions, alcohols, such as butanol or glycol as well as their ethers and esters, ketones, such as acetone, methyl ethyl ketone, methyl isobutyl ketone or cyclohexanone, strongly polar solvents, such as dimethylformamide and dimethyl sulphoxide, and also water. Liquefied gaseous extenders or carriers include those liquids which are gaseous at ambient temperature and at atmospheric pressure, for example aerosol propellants such as halogenated hydrocarbons and also butane, propane, nitrogen and carbon dioxide. As solid carriers there are suitable: for example, ground natural minerals, such as kaolins, clays, talc, chalk, quartz, attapulgite, montmorillonite or diatomaceous earth, and ground synthetic minerals, such as finely divided silica, alumina and silicates. As solid carriers for granules there are suitable: for example, crushed and fractionated natural rocks such as calcite, pumice, marble, sepiolite and dolomite, and also synthetic granules of inorganic and organic meals, and granules of organic material such as sawdust, coconut shells, maize cobs and tobacco stalks. As emulsifiers and/or foam formers there are suitable: for example, non-ionic and anionic emulsifiers, such as polyoxyethylene fatty acid esters, polyoxyethylene fatty alcohol ethers, for example alkylaryl polyglycol ethers, alkylsulphonates, alkyl sulphates, arylsulphonates and protein hydrolysates. As dispersants, for example, lignosulphite waste liquors and methylcellulose are suitable.

Tackifiers such as carboxymethylcellulose and natural and synthetic polymers in the form of powders, granules or latices, such as gum arabic, polyvinyl alcohol and polyvinyl acetate, as well as natural phospholipids, such as cephalins and lecithins, and synthetic phospholipids, can be used in the formulations. Other possible additives are mineral and vegetable oils.

Colorants such as inorganic pigments, for example iron oxide, titanium oxide and Prussian Blue, and organic dyestuffs, such as alizarin dyestuffs, azo dyestuffs and metal phthalocyanine dyestuffs, and trace nutrients such as salts of iron, manganese, boron, copper, cobalt, molybdenum and zinc, can also be used.

Any desired plant or crop can be treated by the composition of the present invention. Especially preferred are treating turfgrass susceptible to *Pythium* disease. Plants are understood in the present context, all plants and plant populations, such as desired and undesired wild plants or crop plants (including naturally occurring crop plants). Crop plants or crops may be plants which can be obtained by conventional breeding and optimization methods or else by biotechnological and genetic engineering methods or by combinations of these methods, including the transgenic plants and including the plant varieties capable or not capable of being protected by plant breeders' rights.

A composition described herein can be applied to a soil, plant, crop, seed, leaf, or plant part thereof in a single application step. In another aspect, a composition described herein is applied to a plant, crop, seed, leaf, or plant part thereof in multiple application steps, for example, two, three, four, five or more application steps. In another aspect, the second, third, fourth, or fifth or more application steps may be with the same or different compositions. The methods described herein also provide for an aspect where multiple application steps are excluded. The enzyme and oxidizer can be applied together or separately.

A composition described herein can be applied to a soil, plant, crop, seed, or plant part thereof in one or more application intervals of about 30 minutes, about 1 hour, about 2 hours, about 6 hours, about 8 hours, about 12 hours, about 1 day, about 5 days, about 7 days, about 10 days, about 12 days, about 14 days, about 21 days, about 28 days, about 35 days, about 45 days, about 50 days, or about 56 days. The composition can be used irrigation systems, ponds, water holding tanks, and the like.

A composition described herein can be applied to a plant, crop, seed, or plant part thereof one or more times during a growing, planting, or harvesting season. In another aspect, a compound or composition described herein is applied to a plant, crop, seed, or plant part thereof in one, two, three, four, or five or more times during a growing, planting, or harvesting season. In another aspect, a compound or composition described herein is applied to a plant, crop, seed, or plant part thereof only one time, no more than two times, or no more than three times during a growing, planting, or harvesting season. In yet another aspect, a compound or composition is applied in a single step to a seed. In yet another aspect, a seed described herein is planted in a one-pass application step.

In another aspect, the disclosure provides for pre-plant, pre-emergent, post-emergent, application steps or combinations thereof. In another aspect, a compound or composition described herein is first applied in a pre-plant step and followed by one or more pre-emergent or post-emergent steps. In yet another aspect, the disclosure provides for only a pre-plant step.

Methods described herein can be used in the treatment of genetically modified organisms (GMOs), e.g., plants or seeds. Genetically modified plants (or transgenic plants) are plants of which a heterologous gene has been stably integrated into genome. The expression "heterologous gene" essentially means a gene which is provided or assembled outside the plant and when introduced in the nuclear, chloroplastic or mitochondrial genome gives the transformed plant new or improved agronomic or other properties by expressing a protein or polypeptide of interest or by down-regulating or silencing other gene(s) which are present in the plant (using for example, antisense technology, cosuppression technology or RNA interference—RNAi—technology). A heterologous gene that is located in the genome is also called a transgene. A transgene that is defined by its particular location in the plant genome is called a transformation or transgenic event.

In an aspect, plants can be obtained by traditional breeding and optimization methods or by biotechnological and recombinant methods, or combinations of these methods, including the transgenic plants and including the plant varieties which are capable or not capable of being protected by Plant Breeders' Rights.

In another aspect, plant species and plant varieties which are found in the wild or which are obtained by traditional biological breeding methods, such as hybridization or protoplast fusion, and parts of these species and varieties are treated. In a further preferred embodiment, transgenic plants and plant varieties which were obtained by recombinant methods, if appropriate in combination with traditional methods (genetically modified organisms) and their parts are treated.

"Plant parts" should be understood as meaning all above ground and subsoil parts and organs of plants, such as shoot, leaf, flower, root, leaves, needles, stalks, stems, fruiting bodies, fruits and seeds, tubers and rhizomes. Plant parts also include harvested crops, and also vegetative and generative propagation material, for example cuttings, tubers, rhizomes, slips and seeds.

Seeds, plant parts, leaves, and plants may be treated with the described compositions by applying the compounds or compositions directly to the seed, plant part, leaf, or plant. In another aspect, the seed, plant part, leaf, or plant may be treated indirectly, for example by treating the environment or habitat in which the seed, plant part, leaf, or plant is exposed to. Conventional treatment methods may be used to treat the environment or habitat including dipping, spraying, fumigating, chemigating, fogging, scattering, brushing on, shanking or injecting.

"Habitat" denotes where a plant or crop is growing or where a plant or crop will be grown. The composition can be used to treat the plant, crop, or habitat thereof.

According to the invention the treatment of the plants and seeds with a composition described herein, can be carried out directly by the customary treatment methods, for example by immersion, spraying, vaporizing, fogging, injecting, dripping, drenching, broadcasting or painting, and seed treatment.

According to the invention, the treatment of the plants and seeds with a composition described herein can be carried out concurrently by applying to a plant or seed a mixture of the enzyme and the oxidizer.

Alternatively, according to the invention, the treatment of the plants and seeds with a composition described herein can be carried out sequentially by applying to a plant or seed first the enzyme followed by the oxidizer.

Alternatively, according to the invention, the treatment of the plants and seeds with a composition described herein can be carried out sequentially by applying to a plant or seed first the oxidizer, followed by the enzyme.

In an aspect, a composition herein treats or reduces fungal spores.

In another aspect, a composition herein treats or reduces fungal spores of the genus *Pythium*.

In yet another aspect, a composition herein treats or reduces fungal spores of *Pythium aphanidermatum*.

In yet another aspect, a composition herein treats or reduces fungal spores of *Pythium ultimum*.

A compound or composition described herein can take any of a variety of dosage forms including, without limitation, suspension concentrates, aerosols, capsule suspensions, cold-fogging concentrates, warm-fogging concentrates, encapsulated granules, fine granules, flowable concentrates for the treatment of seed, ready-to-use solutions, dustable powders, emulsifiable concentrates, oil-in-water emulsions, water-in-oil emulsions, macrogranules, microgranules, oil-dispersible powders, oil-miscible flowable concentrates, oil-miscible liquids, foams, pastes, pesticide-coated seed, suspoemulsion concentrates, soluble concentrates, wettable powders, soluble powders, dusts and granules, water-soluble granules or tablets, water-soluble powders for the treatment of seed, wettable powders, natural products and synthetic substances impregnated with a compound or composition described herein, a net impregnated with a compound or composition described herein, and also microencapsulations in polymeric substances and in coating materials for seed, and also ULV cold-fogging and warm-fogging formulations.

A composition disclosed herein may optionally include one or more additional compounds providing an additional beneficial or otherwise useful effect. Such compounds include, without limitation, an adhesive, a surfactant, a solvent, a wetting agent, an emulsifying agent, a carrier, an adjuvant, a diluent, a dispersing agent an insecticide, a pesticide, a fungicide, a fertilizer of a micronutrient or macronutrient nature, a herbicide, a feeding inhibitor, an insect molting inhibitor, an insect mating inhibitor, an insect maturation inhibitor, a nematocide, a nutritional or horticultural supplement, or any combination thereof. In an aspect, a composition described herein is odor free.

Compositions described herein can be combined with a fertilizer. Examples of fertilizers capable of being used with the compositions and methods described herein include, for example, urea, ammonium nitrate, ammonium sulfate, calcium nitrate, diammonium phosphate, monoammonium phosphate, triple super phosphate, potassium nitrate, potassium nitrate, nitrate of potash, potassium chloride, muriate of potash, di- and mono-potassium salts of phosphite/phosphonate.

The following examples serve to illustrate certain aspects of the disclosure and are not intended to limit the disclosure.

EXAMPLES

Example 1

Example 1 describes the effect of hydrolase enzyme on *Pythium aphanidermatum* zoospores in fescue leaf blades.

Tests were conducted on fescue leaf blades. Five one-inch long fescue leaf blades were placed in 100 ml water (to encourage *Pythium* to produce zoospores) in a 250 ml jar and sterilized for 2 consecutive days for 20 min Five agar plugs containing *Pythium aphanidermatum* mycelium were placed in the jar containing the fescue leaves and allowed to incubate for 5 days.

Each jar was subject to the following treatments: (1) untreated; (2) untreated and exposed to UV light (365 nm); (3) 0.16% enzyme v/v concentration; (4) 0.16% enzyme v/v concentration, followed by exposure to UV light (365 nm); (5) 0.016% enzyme v/v concentration; and (6) 0.016% enzyme v/v concentration followed by exposure to UV light to help enhance efficacy (365 nm).

The UV light source was held 1.5 inches from the water for 5 minutes while stirring. After 5 minutes of exposure to hydrolase enzyme and/or UV light, a 1.0 ml aliquot was removed from each treatment and streaked onto water agar and potato dextrose agar. After seven days the plates were examined for *Pythium* growth.

*Pythium* growth was inhibited completely after 5 minutes of exposure to treatments containing 0.016% enzyme v/v concentration to 0.16% enzyme v/v concentration.

Exposure to UV light rendered the hydrolase enzyme ineffective in controlling *Pythium*.

The results are set forth in Table 1.

TABLE 1

| Treatment (1.0 ml) | *Pythium* growth 7 days after 5 min. exposure to enzyme and/or UV light (365 nm) |
|---|---|
| (1) Untreated | Growth observed on agar plate |
| (2) Untreated + UV light | Growth observed on agar plate |
| (3) 0.16% enzyme v/v concentration | No growth observed on agar plate |
| (4) 0.16% enzyme v/v concentration, followed by UV light | Growth observed on agar plate |
| (5) 0.016% enzyme v/v concentration | No growth observed on agar plate |
| (6) 0.016% enzyme v/v concentration, followed by UV light | Growth observed on agar plate |

Example 2

Example 2 describes the effect of hydrogen on *Pythium aphanidermatum* zoospores in fescue leaf blades.

Tests were conducted on fescue leaf blades. Five one-inch long fescue leaf blades were placed in 100 ml water in a 250 ml jar and sterilized for 2 consecutive days for 20 min. Two agar plugs containing *Pythium aphanidermatum* mycelium were placed in the jar containing the fescue leaves and allowed to incubate for 5 days.

Each jar was subject to the following treatments: (1) untreated; (2) 1.5% hydrogen peroxide v/v concentration; (3) 0.3% hydrogen peroxide v/v concentration; (4) 0.03% hydrogen peroxide v/v concentration; (5) 0.003% hydrogen peroxide v/v concentration; and (6) 0.0003% hydrogen peroxide v/v concentration.

A 1.0 ml aliquot was removed from each treatment and streaked onto potato dextrose agar. Each treatment had 4 repetitions. After five days the plates were examined for *Pythium* growth.

*Pythium* growth was prevented completely by hydrogen peroxide at concentrations of 1.5% hydrogen peroxide v/v concentration and 0.3% hydrogen peroxide v/v concentration.

The results are set forth in Table 2.

TABLE 2

| Treatment (1.0 ml) | Number of plates (4 reps) with *Pythium* growth after 5 days | % Reduction of *Pythium* |
|---|---|---|
| (1) Untreated | 4 | 0 |
| (2) 1.5% hydrogen peroxide v/v concentration | 0 | 100 |
| (3) 0.3% hydrogen peroxide v/v concentration | 0 | 100 |
| (4) 0.03% hydrogen peroxide v/v concentration | 1 | 75 |
| (5) 0.003% hydrogen peroxide v/v concentration | 4 | 0 |
| (6) 0.0003% hydrogen peroxide v/v concentration | 4 | 0 |

Example 3

Example 3 describes the effect of hydrogen peroxide alone and hydrolase enzyme alone on *Pythium aphanidermatum* zoospores in fescue leaf blades.

Tests were conducted on fescue leaf blades. Ten one-inch long fescue leaf blades were placed in 100 ml water in a 250 ml jar and sterilized for 2 consecutive days for 20 min. Two agar plugs containing *Pythium aphanidermatum* mycelium were placed in the jar containing the fescue leaves and allowed to incubate for 12 days.

Ten jars were used in total. Five jars were used for testing the effect of hydrogen peroxide alone. Each of these jars was subject to the following hydrogen peroxide treatments: (1) untreated; (2) 0.03% hydrogen peroxide v/v concentration; (3) 0.012% hydrogen peroxide v/v concentration; (4) 0.006% hydrogen peroxide v/v concentration; and (5) 0.003% hydrogen peroxide v/v concentration.

The remaining five jars were used for testing the effect of hydrolase enzyme alone. Each of these jars was subject to the following enzyme treatments: (1) untreated; (2) 0.016% enzyme v/v concentration; (3) 0.0016% enzyme v/v concentration; (4) 0.00016% enzyme v/v concentration; and (5) 0.000016% enzyme v/v concentration.

A 1.0 ml aliquot was removed from each treatment and streaked onto potato dextrose agar. Each treatment had 4 repetitions. After three days the plates were examined for *Pythium* growth.

*Pythium* grew on all plates at all tested concentrations of hydrogen peroxide except at a concentration of 0.03% hydrogen peroxide v/v concentration.

*Pythium* grew on all plates at all tested concentrations of enzyme except at a concentration of 0.016% enzyme v/v concentration.

The results are set forth in Tables 3A and 3B.

TABLE 3A

| Treatment (1.0 ml) | Number of plates (4 reps) with *Pythium* growth after 3 days | % of Potato Dextrose Sugar Agar Plate Covered with *Pythium* |
|---|---|---|
| (1) Untreated | 4 | 100 |
| (2) 0.03% hydrogen peroxide v/v concentration | 0 | 0 |
| (3) 0.012% hydrogen peroxide v/v concentration | 4 | <50 |

TABLE 3A-continued

| Treatment (1.0 ml) | Number of plates (4 reps) with Pythium growth after 3 days | % of Potato Dextrose Sugar Agar Plate Covered with Pythium |
| --- | --- | --- |
| (4) 0.006% hydrogen peroxide v/v concentration | 4 | 50-90 |
| (5) 0.003% hydrogen peroxide v/v concentration | 4 | 100 |

TABLE 3B

| Treatment (1.0 ml) | Number of plates (4 reps) with Pythium growth after 3 days | % of Potato Dextrose Sugar Agar Plate Covered with Pythium |
| --- | --- | --- |
| (1) Untreated | 4 | 100 |
| (2) 0.016% enzyme v/v concentration | 0 | 0 |
| (3) 0.0016% enzyme v/v concentration | 4 | 100 |
| (4) 0.00016% enzyme v/v concentration | 4 | 100 |
| (5) 0.000016% enzyme v/v concentration | 4 | 100 |

Example 4

Example 4 describes the effect of hydrogen peroxide alone and enzyme alone on *Pythium aphanidermatum* zoospores in fescue leaf blades.

Tests were conducted on fescue leaf blades. Eleven one-inch long fescue leaf blades were placed in 100 ml water in a 250 ml jar and sterilized for 2 consecutive days for 20 min. Two agar plugs containing *Pythium aphanidermatum* mycelium were placed in the jar containing the fescue leaves and allowed to incubate for 8 days.

Eleven jars were used in total. Five jars were used for testing the effect of hydrogen peroxide alone. Each of these jars was subject to the following hydrogen peroxide treatments: (1) untreated; (2) 0.018% hydrogen peroxide v/v concentration; (3) 0.016% hydrogen peroxide v/v concentration; (4) 0.014% hydrogen peroxide v/v concentration; and (5) 0.012% hydrogen peroxide v/v concentration.

The remaining six jars were used for testing the effect of hydrolase enzyme alone. Each of these jars was subject to the following enzyme treatments: (1) untreated; (2) 0.16% enzyme v/v concentration; (3) 0.088% enzyme v/v concentration; (4) 0.016% enzyme v/v concentration; (5) 0.0142% enzyme v/v concentration; and (6) 0.0124% enzyme v/v concentration.

A 1.0 ml aliquot was removed from each treatment and streaked onto potato dextrose agar. Each treatment had 4 repetitions. After three days the plates were examined for *Pythium* growth.

*Pythium* did not grow on plates with enzyme concentrations of 0.16% enzyme v/v concentration and 0.18% enzyme v/v concentration. *Pythium* grew on plates of other concentrations at varying amounts with the least amount of growth at 0.016% enzyme v/v concentration.

*Pythium* did not grow on plates with hydrogen peroxide concentrations of 0.018% hydrogen peroxide v/v concentration and 0.016% hydrogen peroxide concentration. *Pythium* grew on all plates of 0.014% and 0.012% with varying % coverage.

The results are set forth in Tables 4A and 4B.

TABLE 4A

| Treatment (1.0 ml) | Number of plates (4 reps) with Pythium growth after 3 days | % of Potato Dextrose Sugar Agar Plate Covered with Pythium |
| --- | --- | --- |
| (1) Untreated | 4 | 100 |
| (2) 0.018% hydrogen peroxide v/v concentration | 0 | 0 |
| (3) 0.016% hydrogen peroxide v/v concentration | 0 | 0 |
| (4) 0.014% hydrogen peroxide v/v concentration | 4 | 60 |
| (5) 0.012% hydrogen peroxide v/v concentration | 4 | 36.25 |

TABLE 4B

| Treatment (1.0 ml) | Number of plates (4 reps) with Pythium growth after 3 days | % of Potato Dextrose Sugar Agar Plate Covered with Pythium |
| --- | --- | --- |
| (1) Untreated | 4 | 100 |
| (2) 0.16% enzyme v/v concentration | 0 | 0 |
| (3) 0.088% enzyme v/v concentration | 0 | 0 |
| (4) 0.016% enzyme v/v concentration | 1 | 10 |
| (5) 0.0142% enzyme v/v concentration | 4 | 92.5 |
| (6) 0.0124% enzyme v/v concentration | 2 | 35 |

Example 5

Example 5 describes the effect of enzyme and hydrogen peroxide on *Pythium aphanidermatum* zoospores in fescue leaf blades.

Tests were conducted on fescue leaf blades. Five one-inch long fescue leaf blades were placed in 100 ml water in a 250 ml jar and sterilized for 2 consecutive days for 20 min. Two agar plugs containing *Pythium aphanidermatum* mycelium were placed in the jar containing the fescue leaves and allowed to incubate for 7 days.

Each jar was subject to the following treatments: (1) untreated; (2) 0.016% enzyme v/v concentration; (3) 0.0124% enzyme v/v concentration; (4) 0.014% hydrogen peroxide v/v concentration; (5) 0.003% hydrogen peroxide v/v concentration; (6) 0.016% enzyme v/v concentration and 0.014% hydrogen peroxide v/v concentration; and (7) 0.0124% enzyme v/v concentration and 0.003% hydrogen peroxide v/v concentration.

A 1.0 ml aliquot was removed from each treatment and streaked onto potato dextrose agar. Each treatment had 4 repetitions. After three days the plates were examined for *Pythium* growth.

*Pythium* grew at 100% on untreated plates and plates containing 0.016% enzyme, 0.124% enzyme, 0.003% peroxide.

The 0.016% enzyme+0.014% hydrogen peroxide treatment reduced the number of plates with *Pythium* growth from 4 to 2 and the % coverage from 100% to 11.25%.

The 0.0124% enzyme+0.003% hydrogen peroxide treatment reduced the % coverage to 60%.

Thus, these results demonstrate that use of both enzyme and hydrogen peroxide results in an unexpected reduction in *Pythium*.

The results are set forth in Table 5.

TABLE 5

| Treatment (1.0 ml) | Number of plates (4 reps) with *Pythium* growth after 3 days | % of Potato Dextrose Sugar Agar Plate Covered with *Pythium* |
|---|---|---|
| (1) Untreated | 4 | 100 |
| (2) 0.016% enzyme v/v concentration | 4 | 100 |
| (3) 0.0124% enzyme v/v concentration | 4 | 100 |
| (4) 0.014% hydrogen peroxide v/v concentration | 4 | 71.25 |
| (5) 0.003% hydrogen peroxide v/v concentration | 4 | 100 |
| (6) 0.016% enzyme v/v concentration + 0.014% hydrogen peroxide v/v concentration | 2 | 11.25 |
| (7) 0.0124% enzyme v/v concentration + 0.003% hydrogen peroxide v/v concentration | 4 | 60 |

Example 6

Example 6 describes the effect of enzyme and hydrogen peroxide on *Pythium aphanidermatum* zoospores in fescue leaf blades.

Tests were conducted on fescue leaf blades. Five one-inch long fescue leaf blades were placed in 100 ml water in a 250 ml jar and sterilized for 2 consecutive days for 20 min. Two agar plugs containing *Pythium aphanidermatum* mycelium were placed in the jar containing the fescue leaves and allowed to incubate for 7 days.

Each jar was subject to the following treatments: (1) untreated; (2) 0.016% enzyme v/v concentration; (3) 0.014% hydrogen peroxide v/v concentration; (4) 0.016% hydrogen peroxide v/v concentration; (5) 0.018% hydrogen peroxide v/v concentration; (6) 0.016% enzyme v/v concentration and 0.014% hydrogen peroxide v/v concentration; (7) 0.016% enzyme v/v concentration and 0.016% hydrogen peroxide v/v concentration; and (8) 0.016% enzyme v/v concentration and 0.018% hydrogen peroxide v/v concentration.

A 1.0 ml aliquot was removed from each treatment and streaked onto potato dextrose agar. Each treatment had 4 repetitions. After three days the plates were examined for *Pythium* growth.

*Pythium grew at* 100% on untreated plates, 17.5% on plates treated with 0.016% enzyme, 17.5% on plates treated with 0.014% hydrogen peroxide, 10% on plates treated with 0.016% hydrogen peroxide, and 17.5% on plates treated with 0.018% hydrogen peroxide.

There was 0% *Pythium* growth in all mixtures of enzyme and hydrogen peroxide.

Thus, these results demonstrate that use of both enzyme and hydrogen peroxide results in an unexpected reduction in *Pythium*.

The results are set forth in Table 6.

TABLE 6

| Treatment (1.0 ml) | Number of plates (4 reps) with *Pythium* growth after 3 days | % of Potato Dextrose Sugar Agar Plate Covered with *Pythium* |
|---|---|---|
| (1) Untreated | 4 | 100 |
| (2) 0.016% enzyme v/v concentration | 2 | 17.5 |
| (3) 0.014% hydrogen peroxide v/v concentration | 1 | 17.5 |
| (4) 0.016% hydrogen peroxide v/v concentration | 1 | 10 |
| (5) 0.018% hydrogen peroxide v/v concentration | 1 | 17.5 |
| (6) 0.016% enzyme v/v concentration + 0.014% hydrogen peroxide v/v concentration | 0 | 0 |
| (7) 0.016% enzyme v/v concentration + 0.016% hydrogen peroxide v/v concentration | 0 | 0 |
| (8) 0.016% enzyme v/v concentration + 0.018% hydrogen peroxide v/v concentration | 0 | 0 |

Example 7

Example 7 describes the effect of enzyme and hydrogen peroxide on *Pythium aphanidermatum* zoospores in fescue leaf blades. This trial was conducted to confirm the results of Example 6 above.

Tests were conducted on fescue leaf blades. Five one-inch long fescue leaf blades were placed in 100 ml water in a 250 ml jar and sterilized for 2 consecutive days for 20 min. Two agar plugs containing *Pythium aphanidermatum* mycelium were placed in the jar containing the fescue leaves and allowed to incubate for 7 days.

Each jar was subject to the following treatments: (1) untreated; (2) 0.016% enzyme v/v concentration; (3) 0.014% hydrogen peroxide v/v concentration; (4) 0.016% hydrogen peroxide v/v concentration; (5) 0.018% hydrogen peroxide v/v concentration; (6) 0.016% enzyme v/v concentration and 0.014% hydrogen peroxide v/v concentration; (7) 0.016% enzyme v/v concentration and 0.016% hydrogen peroxide v/v concentration; and (8) 0.016% enzyme v/v concentration and 0.018% hydrogen peroxide v/v concentration.

A 1.0 ml aliquot was removed from each treatment and streaked onto potato dextrose agar. Each treatment had 4 repetitions. After three days the plates were examined for *Pythium* growth.

*Pythium* grew at 100% on untreated plates, 92% on plates treated with 0.016% enzyme, 72.5% on plates treated with 0.014% hydrogen peroxide, 38.8% on plates treated with 0.016% hydrogen peroxide, and 85.8% on plates treated with 0.018% hydrogen peroxide.

There was 0% *Pythium* growth with low and mid concentrations of hydrogen peroxide and enzyme and 10% growth with high rate of peroxide and enzyme.

Thus, these results demonstrate that use of both enzyme and hydrogen peroxide results in an unexpected reduction in *Pythium*.

The results are set forth in Table 7.

TABLE 7

| Treatment (1.0 ml) | Number of plates (4 reps) with *Pythium* growth after 3 days | % of Potato Dextrose Sugar Agar Plate Covered with *Pythium* |
|---|---|---|
| (1) Untreated | 4 | 100 |
| (2) 0.016% enzyme v/v concentration | 4 | 92 |
| (3) 0.014% hydrogen peroxide v/v concentration | 4 | 72.5 |
| (4) 0.016% hydrogen peroxide v/v concentration | 4 | 38.8 |
| (5) 0.018% hydrogen peroxide v/v concentration | 4 | 85.8 |
| (6) 0.016% enzyme v/v concentration + 0.014% hydrogen peroxide v/v concentration | 0 | 0 |
| (7) 0.016% enzyme v/v concentration + 0.016% hydrogen peroxide v/v concentration | 0 | 0 |
| (8) 0.016% enzyme v/v concentration + 0.018% hydrogen peroxide v/v concentration | 1 | 10 |

Example 8

Example 8 describes the effect of enzyme and hydrogen peroxide on *Pythium aphanidermatum* zoospores in fescue leaf blades.

Tests were conducted on fescue leaf blades. Five one-inch long fescue leaf blades were placed in 100 ml water in a 250 ml jar and sterilized for 2 consecutive days for 20 min. Two agar plugs containing *Pythium aphanidermatum* mycelium were placed in the jar containing the fescue leaves and allowed to incubate for 7 days.

Each jar was subject to the following treatments: (1) untreated; (2) 0.016% enzyme v/v concentration; (3) 0.014% hydrogen peroxide v/v concentration; (4) 0.02% hydrogen peroxide v/v concentration; (5) 0.016% enzyme v/v concentration and 0.014% hydrogen peroxide v/v concentration; and (6) 0.016% enzyme v/v concentration and 0.02% hydrogen peroxide v/v concentration.

A 1.0 ml aliquot was removed from each treatment and streaked onto potato dextrose agar. Each treatment had 4 repetitions. After three days the plates were examined for *Pythium* growth.

*Pythium* grew at 100% on untreated plates.

*Pythium* grew at 92%, 90%, and 56.3% on plates treated with 0.016% enzyme, 0.014% hydrogen peroxide, and 0.02% hydrogen peroxide, respectively.

There was 0% *Pythium* growth with 0.016% enzyme+0.014% hydrogen peroxide v/v concentration and 7.5% *Pythium* growth with 0.016% enzyme+0.02% hydrogen peroxide v/v concentration.

Concentrations of the hydrogen peroxide greater than 0.014%+0.016% enzyme appear to be antagonist and hindered effectiveness of enzyme.

These results demonstrate that use of both enzyme and hydrogen peroxide results in an unexpected reduction in *Pythium*.

The results are set forth in Table 8.

TABLE 8

| Treatment (1.0 ml) | Number of plates (4 reps) with *Pythium* growth after 3 days | % of Potato Dextrose Sugar Agar Plate Covered with *Pythium* |
|---|---|---|
| (1) Untreated | 4 | 100 |
| (2) 0.016% enzyme v/v concentration | 4 | 92.5 |
| (3) 0.014% hydrogen peroxide v/v concentration | 4 | 90 |
| (4) 0.02% hydrogen peroxide v/v concentration | 4 | 56.3 |
| (5) 0.016% enzyme v/v concentration + 0.014% hydrogen peroxide v/v concentration | 0 | 0 |
| (6) 0.016% enzyme v/v concentration + 0.02% hydrogen peroxide v/v concentration | 2 | 7.5 |

Example 9

Example 9 describes the effect of enzyme and hydrogen peroxide on *Pythium aphanidermatum* zoospores in fescue leaf blades.

Tests were conducted on fescue leaf blades. Five one-inch long fescue leaf blades were placed in 100 mL water in a 250 mL jar and sterilized for 2 consecutive days for 20 min. Two agar plugs containing *Pythium aphanidermatum* mycelium were placed in the jar containing the fescue leaves and allowed to incubate for 7 days.

Each jar was subject to the following treatments: (1) untreated; (2) 0.016% enzyme v/v concentration; (3) 0.014% hydrogen peroxide v/v concentration; (4) 0.016% hydrogen peroxide v/v concentration; (5) 0.018% hydrogen peroxide v/v concentration; (6) 0.02% hydrogen peroxide v/v concentration; (7) 0.016% enzyme v/v concentration and 0.014% hydrogen peroxide v/v concentration; (8) 0.016% enzyme v/v concentration and 0.016% hydrogen peroxide v/v concentration; (9) 0.016% enzyme v/v concentration and 0.018% hydrogen peroxide v/v concentration; and (10) 0.016% enzyme v/v concentration and 0.02% hydrogen peroxide v/v concentration.

A 1.0 mL aliquot was removed from each treatment and streaked onto potato dextrose agar. Each treatment had 4 repetitions. After three days the plates were examined for *Pythium* growth.

*Pythium* grew at 100% on untreated plates.

*Pythium* grew at 21.67%, 100%, 63.75%, 91.25%, and 25% on plates treated with 0.016% enzyme, 0.014% hydrogen peroxide, 0.016% hydrogen peroxide, 0.018% hydrogen peroxide, and 0.02% hydrogen peroxide, respectively.

With the combinations, *Pythium* grew at 11.25%, 0%, 0%, and 0%, respectively with 0.016% enzyme+0.014% hydrogen peroxide, 0.016% enzyme+0.016% hydrogen peroxide, 0.016% enzyme+0.018% hydrogen peroxide and 0.016% enzyme+0.02% hydrogen peroxide.

Concentrations of the hydrogen peroxide greater than 0.014%+0.016% enzyme appear to be antagonist and hindered effectiveness of enzyme.

These results demonstrate that use of both enzyme and hydrogen peroxide results in an unexpected reduction in *Pythium*.

The results are set forth in Table 9.

TABLE 9

| Treatment (1.0 mL) | Number of plates (4 reps) with *Pythium* growth after 3 days | % of Potato Dextrose Sugar Agar Plate Covered with *Pythium* |
|---|---|---|
| (1) Untreated | 4 | 100 |
| (2) 0.016% enzyme v/v concentration | 3 | 21.67 |
| (3) 0.014% hydrogen peroxide v/v concentration | 4 | 100 |
| (4) 0.016% hydrogen peroxide v/v concentration | 4 | 63.75 |
| (5) 0.018% hydrogen peroxide v/v concentration | 4 | 91.25 |
| (6) 0.02% hydrogen peroxide v/v concentration | 4 | 25 |
| (7) 0.016% enzyme v/v concentration + 0.014% hydrogen peroxide v/v concentration | 1 | 11.25 |
| (8) 0.016% enzyme v/v concentration + 0.016% hydrogen peroxide v/v concentration | 0 | 0 |
| (9) 0.016% enzyme v/v concentration + 0.018% hydrogen peroxide v/v concentration | 0 | 0 |
| (10) 0.016% enzyme v/v concentration + 0.02% hydrogen peroxide v/v concentration | 0 | 0 |

The invention claimed is:

1. A method for controlling fungus in a plant comprising applying a synergistic combination of hydrolase and a peroxide to a plant or habitat thereof to thereby control the fungus, wherein the plant is turfgrass.

2. The method according to claim 1, comprising applying concurrently to the plant or habitat thereof a composition comprising a mixture of the hydrolase and the peroxide.

3. The method according to claim 1, comprising applying sequentially to the plant or habitat thereof a composition comprising the hydrolase followed by a composition comprising the peroxide.

4. The method according to claim 1, comprising applying sequentially to the plant or habitat thereof a composition comprising the peroxide followed by a composition comprising the hydrolase.

5. The method according to claim 1, wherein the peroxide is hydrogen peroxide.

6. The method according to claim 1, wherein the hydrolase is present at a concentration of 0.0001% to 10% v/v concentration.

7. The method according to claim 1, wherein the peroxide is present at a concentration of 0.0001% to 10% v/v concentration.

8. The method according to claim 1, wherein the weight ratio of the hydrolase to the peroxide is from 1:50 to 50:1.

9. The method according to claim 1, wherein the fungus is from the genus *Pythium*.

10. The method according to claim 1, wherein the fungus is *Pythium aphanidermatum*.

11. The method according to claim 1, wherein the fungus is *Pythium ultimum*.

12. The method according to claim 1, wherein the turfgrass is St. Augustine grass, bermudagrass, bahiagrass, buffalograss, centipedegrass, Kentucky bluegrass, fine fescue, tall fescue, perennial ryegrass, creeping bentgrass, zoysiagraoss, crabgrass, guineagrass, pangolagrass, torpedograss, or tropical carpetgrass.

13. The method according to claim 1, wherein the treated plants are infected with a fungus from the genus *Pythium*.

14. The method according to claim 1, wherein the hydrolase and the peroxide are the only active agents.

15. The method according to claim 1, wherein the weight ratio of the hydrolase to the peroxide is from 1:5 to 5:1.

16. The method according to claim 1, wherein the hydrolase is present at a concentration of 0.005% to 1% v/v concentration and the peroxide is present at a concentration of 0.001% to 0.1% v/v concentration.

17. A composition for controlling fungus in a plant, comprising a synergistic combination of a hydrolase and a peroxide, wherein the hydrolase is present at a concentration of 0.005 to 1% v/v concentration and the peroxide is present at a concentration of 0.001 to 0.1% v/v concentration.

18. The synergistic composition according to claim 17, wherein the hydrolase and the peroxide are the only active agents.

* * * * *